United States Patent
McCann et al.

(10) Patent No.: US 8,825,060 B2
(45) Date of Patent: Sep. 2, 2014

(54) METHODS, SYSTEMS, AND COMPUTER READABLE MEDIA FOR DYNAMICALLY LEARNING DIAMETER BINDING INFORMATION

(75) Inventors: Thomas Matthew McCann, Raleigh, NC (US); Mark Edward Kanode, Apex, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/409,914

(22) Filed: Mar. 1, 2012

(65) Prior Publication Data
US 2012/0225679 A1 Sep. 6, 2012

Related U.S. Application Data

(60) Provisional application No. 61/448,048, filed on Mar. 1, 2011.

(51) Int. Cl.
*H04W 40/00* (2009.01)
*H04L 12/28* (2006.01)

(52) U.S. Cl.
USPC ........... 455/445; 455/466; 370/392; 370/389; 370/401

(58) Field of Classification Search
CPC ................. H04W 40/00; H04W 12/06–12/08; H04W 68/00; H04W 48/18; H04L 45/28; H04L 45/34; H04L 45/60
USPC ................... 455/466, 445; 370/392, 389, 401; 709/238; 379/142.06, 221.14
See application file for complete search history.

(56) References Cited

U.S. PATENT DOCUMENTS 1,872,857 A 4/1931 Wesson et al.
6,298,383 B1 10/2001 Gutman et al.
(Continued)

FOREIGN PATENT DOCUMENTS

EP 1 357 720 A1 10/2003
EP 2 242 205 A1 10/2010
(Continued)

OTHER PUBLICATIONS

Notification of Transmittal of the International Search Report and the Written Opinion of the International Searching Authority, or the Declaration for International Patent Application No. PCT/US2012/027281 (Jun. 15, 2012).
(Continued)

*Primary Examiner* — George Eng
*Assistant Examiner* — Joseph Dean, Jr.
(74) *Attorney, Agent, or Firm* — Jenkins, Wilson, Taylor & Hunt, P.A.

(57) ABSTRACT

Methods, systems, and computer readable media for dynamically learning Diameter binding information are disclosed. According to one method, the method comprises receiving one or more response messages associated with the one or more Diameter signaling messages, determining, based on information contained in the one or more response messages, whether at least one of the one or more network service nodes was able to successfully process the one or more Diameter signaling messages, and generating, in response to determining that at least one of the one or more network service nodes was able to successfully process at least one of the one or more Diameter request messages, a Diameter binding record that associates the identification information and the at least one of the one or more network service nodes.

25 Claims, 7 Drawing Sheets

(56) References Cited

U.S. PATENT DOCUMENTS

| | | |
|---|---|---|
| 7,292,592 B2 | 11/2007 | Rune |
| 7,551,926 B2 | 6/2009 | Rune |
| 8,015,293 B2 | 9/2011 | Schaedler et al. |
| 2002/0147845 A1 | 10/2002 | Sanchez-Herrero et al. |
| 2002/0194378 A1 | 12/2002 | Foti |
| 2002/0196775 A1 | 12/2002 | Tuohino et al. |
| 2003/0040280 A1 | 2/2003 | Koskelainen |
| 2003/0131151 A1 | 7/2003 | Roach et al. |
| 2004/0103157 A1 | 5/2004 | Requena et al. |
| 2004/0152469 A1 | 8/2004 | Yla-Outinen et al. |
| 2004/0205212 A1 | 10/2004 | Huotari et al. |
| 2004/0223489 A1 | 11/2004 | Rotsten et al. |
| 2004/0225878 A1 | 11/2004 | Costa-Requena et al. |
| 2004/0246965 A1 | 12/2004 | Westman et al. |
| 2005/0007984 A1 | 1/2005 | Shaheen et al. |
| 2005/0058125 A1 | 3/2005 | Mutikainen et al. |
| 2005/0078642 A1 | 4/2005 | Mayer et al. |
| 2005/0094594 A1* | 5/2005 | Roh .............................. 370/328 |
| 2005/0120198 A1 | 6/2005 | Bajko et al. |
| 2005/0124341 A1 | 6/2005 | Myllymaki et al. |
| 2005/0155036 A1 | 7/2005 | Tiainen et al. |
| 2005/0159156 A1 | 7/2005 | Bajko et al. |
| 2005/0235000 A1 | 10/2005 | Keil |
| 2006/0030320 A1 | 2/2006 | Tammi et al. |
| 2006/0045249 A1 | 3/2006 | Li et al. |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1* | 6/2006 | Schaedler et al. ............ 709/203 |
| 2006/0161512 A1 | 7/2006 | Schaedler et al. |
| 2006/0172730 A1 | 8/2006 | Matsuda |
| 2006/0221972 A1 | 10/2006 | Bhargava et al. |
| 2006/0259759 A1 | 11/2006 | Maino et al. |
| 2006/0274744 A1 | 12/2006 | Nagai et al. |
| 2007/0121596 A1 | 5/2007 | Kurapati et al. |
| 2007/0242637 A1 | 10/2007 | Dynarski et al. |
| 2007/0297419 A1 | 12/2007 | Askerup et al. |
| 2008/0039104 A1 | 2/2008 | Gu et al. |
| 2009/0080440 A1 | 3/2009 | Balyan et al. |
| 2009/0129271 A1 | 5/2009 | Ramankutty et al. |
| 2009/0196231 A1 | 8/2009 | Giaretta et al. |
| 2009/0196290 A1* | 8/2009 | Zhao et al. .................... 370/392 |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0290392 A1 | 11/2010 | Rasanen et al. |
| 2010/0291923 A1 | 11/2010 | Zhou et al. |
| 2010/0299451 A1 | 11/2010 | Yigang et al. |
| 2010/0311392 A1 | 12/2010 | Stenfelt et al. |
| 2010/0331023 A1* | 12/2010 | Cai et al. ....................... 455/466 |
| 2011/0116378 A1 | 5/2011 | Ramankutty et al. |
| 2011/0116382 A1 | 5/2011 | McCann et al. |
| 2011/0165901 A1 | 7/2011 | Baniel et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Craig et al. |
| 2011/0202676 A1 | 8/2011 | Craig et al. |
| 2011/0225113 A1 | 9/2011 | Mann |
| 2011/0225280 A1 | 9/2011 | Delsesto et al. |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0096177 A1 | 4/2012 | Rasanen |
| 2012/0124220 A1 | 5/2012 | Zhou et al. |
| 2012/0155389 A1 | 6/2012 | McNamee et al. |
| 2012/0155470 A1 | 6/2012 | McNamee et al. |
| 2012/0202550 A1 | 8/2012 | Marsico |
| 2012/0224524 A1 | 9/2012 | Marsico |
| 2012/0224531 A1 | 9/2012 | Karuturi et al. |
| 2012/0226758 A1 | 9/2012 | Sprague et al. |
| 2012/0226814 A1 | 9/2012 | Stucker |
| 2012/0239771 A1 | 9/2012 | Rasanen |
| 2012/0311064 A1 | 12/2012 | Deo |

FOREIGN PATENT DOCUMENTS

| | | |
|---|---|---|
| EP | 2 220 841 B1 | 9/2011 |
| EP | 1 846 832 B1 | 4/2012 |
| WO | WO 2006/066149 A2 | 6/2006 |
| WO | WO 2010/139360 A1 | 12/2010 |
| WO | WO 2011/082090 A2 | 7/2011 |
| WO | WO 2011/156274 A2 | 12/2011 |
| WO | WO 2012/106710 A1 | 8/2012 |
| WO | WO 2012/118959 A1 | 9/2012 |
| WO | WO 2012/118967 A1 | 9/2012 |
| WO | WO 2012/119147 A1 | 9/2012 |
| WO | WO 2012/154674 A2 | 11/2012 |

OTHER PUBLICATIONS

Notification of Transmital of the International Search Report and the Written Opinion of the International Searching Authority, or the Declaration for International Patent Application No. PCT/US2012/027063 (Jun. 14, 2012).

Notification of Transmital of the International Search Report and the Written Opinion of the International Searching Authority, or the Declaration for International Patent Application No. PCT/US2012/027736 (Jun. 12, 2012).

Notification of Transmital of the International Search Report and the Written Opinion of the International Searching Authority, or the Declaration for International Patent Application No. PCT/US2012/023971 (Jun. 11, 2012).

Commonly Assigned, Co-pending International Application No. PCT/US12/27736 for "Methods, Systems, and Computer Readable Media for Enriching a Diameter Signaling Message", (Unpublished, filed Mar. 5, 2012).

Commonly Assigned Co-pending U.S. Appl. No. 13/412,352 titled "Methods, Systems, and Computer Readable Media for Enriching a Diameter Signaling Message", (unpublished, filed Mar. 5, 2012).

Commonly Assigned, Co-pending International Application No. PCT/US12/27281 for "Methods, Systems, and Computer Readable Media for Hybrid Session Based Diameter Routing", (Unpublished, filed Mar. 1, 2012).

Commonly Assigned, Co-pending U.S. Appl. No. 13/409,949 titled "Methods, Systems, and Computer Readable Media for Hybrid Session Based Diameter Routing," (unpublished, filed Mar. 1, 2012).

Commonly Assigned, Co-pending International Application No. PCT/US12/27263 for "Methods, Systems, and Computer Readable Media for Sharing Diameter Binding Data", (Unpublished, filed Mar. 1, 2012).

Commonly Assigned, Co-pending U.S. Appl. No. 13/409,893 for "Methods, Systems, and Computer Readable Media for Sharing Diameter Binding Data", (Unpublished, filed Mar. 1, 2012).

Notification of Transmittal of the International Search Report and the Written Opinion of the International Searching Authority, or the Declaration for International Application No. PCT/US2011/039285 (Feb. 9, 2012).

Commonly Assigned, Co-pending International No. PCT/US12/23971 for "Methods, Systems, and Computer Readable Media for Provisioning A Diameter Binding Repository", (Unpublished, filed Feb. 6, 2012).

Commonly Assigned Co-pending U.S. Appl. No. 13/366,928 titled "Methods, Systems, and Computer Readable Media for Provisioning A Diameter Binding Repository," (unpublished, filed Feb. 6, 2012).

Notification of the Transmittal of the International Search Report and the Written Opinion of the International Searching Authority, or the Declaration for International Application No. PCT/US2010/061934 (Oct. 25, 2011).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)." 3GPP TS 29.272. V10.2.0. pp. 1-95 (Mar. 2011).

(56) References Cited

OTHER PUBLICATIONS

3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Znaty, "Diameter, GPRS, (LTE + ePC =EPS, IMS, PCC and SDM," Effort, pp. 1-229 (Part 1 of 2) (May 2010).
Znaty, "Diameter, GPRS, (LTE +ePC =EPS), IMS, PCC and SDM," Efort pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
Calhoun et al., "Diameter Base Protcol," Network Working Group, RFC 3588 (Sep. 2003).
Notification of Transmittal of the Internation Search Report and the Written Opinion of the International Searching Authority, or the Declaration for International Patent Application No. PCT/US2012/027269 (Jun. 11, 2012).
Notice of Allowance and Fee(s) Due to U.S. Appl. No. 13/366,928 (Jan. 7, 2013).
Non-Final Office Action for U.S. Appl. No. 13/192,410 (Dec. 20, 2010).
Non-Final Office Action for U.S. Appl. No. 13/409,893 (Dec. 13, 2012).
Commonly-assigned, co-pending U.S. Appl. No. 13/712,481 for "Methods, Systems, and Computer Readable Media for Encrypting Diameter Identification Information in a Communication Network," (Unpublished, filed Dec. 12, 2012).
Notification of Transmittal of the International Search Report and the Written Opinion of the International Searching Authority, or the Declaration for International Patent Application No. PCT/US2012/036784 (Nov. 1, 2012).
Non-Final Official Action for U.S. Appl. No. 13/412,352 (Oct. 26, 2012).
Communication of European publication number and information on the application of Article 67(3) EPC for European Patent Application No. 10841605.8 (Oct. 17, 2012).
Decision to grant a European patent pursuant to Article 97(1) EPC for European Application No. 05854512.0 (Mar. 15, 2012).
Communication under Rule 71(3) EPC for European application No. 05854512.0 (Nov. 11, 2011).
Notice of Allowance and Fee(s) Due for U.S. Appl. No. 11/303,757 (May 11, 2011).
Official Action for U.S. Appl. No. 11/303,757 (Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
Communication pursuant to Article 94(3) EPC for European Application No. 05 854 512.0 (Oct. 12, 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207. V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0 (Oct. 2010).
Communication pursuant to Article 94(3) EPC for European Application No. 05854512.0 (Feb. 8, 2010).
Final Official Action for U.S. Appl. No. 11/303,757 (Dec. 9, 2009).
Supplementary European Search Report for European Application No. 058545120.0 (Nov. 17, 2009).
Official Action for U.S. Appl. No. 11/303,757 (May 28, 2009).
Final Official Action for U.S. Appl. No. 11/303,757 (Oct. 6, 2008).
Official Action for U.S. Appl. No. 11/303,757 (May 7, 2008).
Notification of Transmittal of the International Search Report and the Written Opinion corresponding to International Application No. PCT/US05/45813 (Mar. 24, 2008).
Official Action for U.S. Appl. No. 11/303,757 (Feb. 21, 2008).
Restriction Requirment for U.S. Appl. No. 11/303,757 (Oct. 4, 2007).
"Tekelec Announces TekCore IMS Core Platform," (Jun. 5, 2006).
"Operator Guidebook to IMS and New Generation Networks and Services," www.morianagroup.com, Second Edition (Feb. 2006).
Hakala et al., "Diameter Credit-Control Application," FRC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 3261, pp. 1-252 (Jun. 2002).
Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).
Calhoun et al., "Diameter Base Protocol,"draft-ietf-aaa-diameter-07, Section 6.3, p. 68 (Jul. 2001).
Narten et al., "Privacy Extensions for Stateless Address Autoconfiguration in IPv6," RFC 3041, pp. 1-16 (Jan. 2001).
Faltstrom, "E.164 Number and DNS," FRC 2916, pp. 1-10 (Sep. 2000).

(56) References Cited

OTHER PUBLICATIONS

Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Notice of Allowance and Fee(s) Due for U.S. Appl. No. 12/974,869 (Aug. 19, 2013).
Final Office Action for U.S. Appl. No. 13/192,410 (Aug. 5, 2013).
Final Office Action for U.S. Appl. No. 13/409,893 (Jul. 1, 2013).
Notice of Allowance and Fee(s) Due for U.S. Appl. No. 13/412,352 (May 28, 2013).
Non-Final Office Action for U.S. Appl. No. 13/366,928 (Mar. 26, 2013).
Non-Final Office Action for U.S. Appl. No. 13/409,949 (Feb. 15, 2013).
Rouse, "Platform," http://searchservervirtualization.techtarget.com/definition/platform, pp. 1-2 (2006-2009).

* cited by examiner

FIG. 1

| DIAMETER SESSION ID 202 | USER NAME 204 | IMSI 206 | IMS PRIVATE IDENTITY (IMPI) 208 | IMS PUBLIC IDENTITY (IMPU) 210 | SIP UNIFORM RESOURCE IDENTIFIER (URI) 212 | NETWORK ACCESS IDENTIFIER (NAI) 214 | MOBILE / DIALABLE NUMBER 216 | USER INTERNET PROTOCOL ADDRESS 218 | ACCESS POINT NAME (APN) 220 | HSS IDENTIFIER / ADDRESS 222 |
|---|---|---|---|---|---|---|---|---|---|---|
| 123 | X | Y | | | | | | Z | INTERNET.ATT | HSS 1 |
| 345 | | | XX | | | | | ZZ | INTERNET.TB2.MVW4.GPRS | HSS 2 |
| 678 | XXX | | | | TTT | | | ZZZ | PREPAID INTERNET | HSS 1 |

METHODS, SYSTEMS, AND COMPUTER READABLE MEDIA FOR DYNAMICALLY LEARNING DIAMETER BINDING INFORMATION

PRIORITY CLAIM

This application claims the benefit of U.S. Provisional Patent Application Ser. No. 61/448,048 filed Mar. 1, 2011; the disclosure of which is incorporated herein by reference in its entirety.

TECHNICAL FIELD

The subject matter described herein relates to enhancing Diameter binding records that associate mobile subscribers with network service nodes. More specifically, the subject matter relates to methods, systems, and computer readable media for dynamically learning Diameter binding information.

BACKGROUND

At present, problems exist with the assignment of Diameter-based network service nodes to Diameter signaling messages associated with a common signaling transaction and/or mobile subscriber. Namely, there are difficulties associated with the identification and correlation of subsequently received Diameter signaling messages to the initially received Diameter signaling message transaction. As a consequence, Diameter signaling messages received at a Diameter routing node may not be forwarded to the same network service node assigned to an existing Diameter signaling message transaction that is associated with a particular mobile subscriber.

Accordingly, a need exists for improved methods, systems, and computer readable media for dynamically learning Diameter binding information.

SUMMARY

Methods, systems, and computer readable media for dynamically learning Diameter binding information are disclosed. According to one method, the method comprises receiving one or more response messages associated with the one or more Diameter signaling messages, determining, based on information contained in the one or more response messages, whether at least one of the one or more network service nodes was able to successfully process the one or more Diameter signaling messages, and generating, in response to determining that at least one of the one or more network service nodes was able to successfully process at least one of the one or more Diameter request messages, a Diameter binding record that associates the identification information and the at least one of the one or more network service nodes.

A system for dynamically learning Diameter binding information is also disclosed. The system includes a Diameter binding repository (DBR) and a Diameter routing node. The DBR is configured to store Diameter binding records. The Diameter routing node is configured to route one or more Diameter signaling messages to one or more network service nodes, wherein the one or more Diameter signaling messages include identification information, to receive one or more response messages associated with the one or more Diameter signaling messages, to determine, based on information contained in the one or more response messages, whether at least one of the one or more network service nodes was able to successfully process the one or more Diameter signaling messages, and to generate, in response to determining that at least one of the one or more network service nodes was able to successfully process at least one of the one or more Diameter request messages, a Diameter binding record that associates the identification information and the at least one of the one or more network service nodes.

The subject matter described herein may be implemented in software in combination with hardware and/or firmware. For example, the subject matter described herein may be implemented in software executed by a processor. In one exemplary implementation, the subject matter described herein for dynamically learning Diameter binding information may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for dynamically learning Diameter binding information. As used herein, the term Diameter refers to the authentication, authorization, and accounting (AAA) protocol utilized by telecommunications and computer networks as defined by RFC 3588. In some embodiments, the present subject matter includes a Diameter signaling routing (DSR) node that receives a Diameter signaling message associated with a particular mobile subscriber. The received Diameter signaling message may also require processing from a particular type of network service node, such as a network charging function node (e.g., a charging data function (CDF), a policy and charging rules function (PCRF), etc.) and home subscriber server (HSS), or AAA node. Upon receiving a Diameter signaling message, the DSR may be configured to either assign one of a plurality of network service nodes to process the received Diameter signaling message or determine whether a network service node is already assigned (or "bound") to the mobile subscriber.

In some embodiments, the DSR may be configured to determine or select an appropriate network service node (e.g., a CDF or PCRF) based on a load balancing algorithm, such as a load balancing hashing function that uses information contained in the received Diameter signaling message. The present subject matter may also include a binding repository, such as a session binding repository (SBR), for maintaining binding records that associates a node and a given subscriber, session, and/or other identifiers. For example, binding records may be created and stored after a selected node has been confirmed as capable of successfully processing a Diameter message associated with a given subscriber and/or session.

Advantageously, the subject matter described herein can be utilized such that the need to recreate or update a binding record for each Diameter session or subscriber is minimized. For example, by waiting until processing ability confirmation by a network service node to create and store a binding record, Diameter routing nodes in accordance with the present subject matter can avoid excessive updating of a binding repository and avoid routing Diameter messages to nodes that cannot process or service the Diameter messages and related additional re-routing. As compared to solutions that store binding records before confirmation of processing ability, the present subject matter provides a much more efficient solution in terms of processing and storage resource usage.

Figure 1:
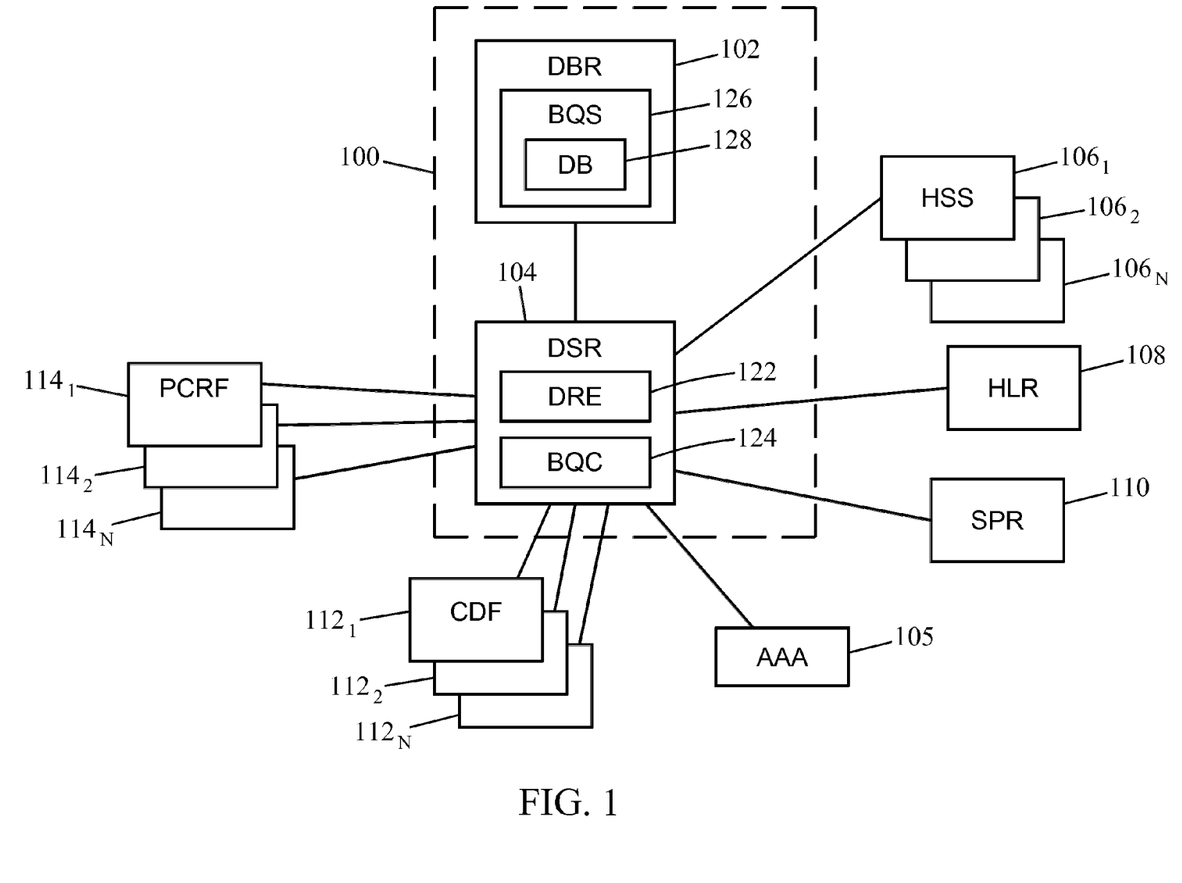
FIG. 1 is a block diagram illustrating a system for dynamically learning Diameter binding information according to an embodiment of the subject matter described herein.

FIG. 1 depicts an exemplary system 100 for dynamically learning Diameter binding information according to an embodiment of the subject matter described herein. In some embodiments, system 100 may be implemented in a Long Term Evolution (LTE) network, an Internet protocol Multimedia Subsystem (IMS) network, or other networks without departing from the scope of the present subject matter.

System 100 may include a Diameter routing node, e.g., DSR 104, configured to receive a Diameter signaling message that is associated with a mobile subscriber. Although FIG. 1 illustrates the use of a DSR, any network node that is configured to route Diameter signaling messages may be utilized without departing from the scope of the subject matter. For example, the network node may also include a Diameter routing agent (DRA), a Diameter proxy agent (DPA), a Diameter relay agent, a Diameter translation agent, and the like. In some embodiments, DSR 104 may include a Diameter routing engine (DRE) 122 that may be configured to route Diameter signaling messages between various Diameter nodes on various Diameter interfaces including, but not limited to, the Gy, Ro, Rf, S6d, and S6a interfaces. Exemplary Diameter-based signaling message received by DSR 104 include a credit control request (CCR) message, an accounting request (ACR) message, an update location request (ULR) message, a Diameter mobility management message, and a Diameter charging message. In some embodiments, the Diameter-based signaling message may be sent to the Diameter routing node by a network node (not shown) such as, for example, a policy and charging enforcement function (PCEF) node, a gateway GPRS support node (GGSN), a mobility management entity (MME), and a public data network (PDN) gateway.

DSR 104 may also include a binding query client (BQC) 124 that is configured to communicate (e.g., send and receive) Diameter-based signaling messages to one or more DBRs (e.g., DBR 102).

In some embodiments, the Diameter signaling message received by DSR 104 may originally be destined or addressed to a network service node that is capable of processing the Diameter signaling message. For example, a network service node may include a policy and charging rules function (PCRF) node 114, a network charging node (e.g., a charging data function (CDF) 112, a charging trigger function (CTF), a charging gateway function (CGF)), an online charging system (OCS) node, an offline charging system (OFCS) node, a home subscriber server (HSS) 106, a home location register node (HLR) 108, an AAA node 105, a subscriber profile repository 110, and a call session control function (CSCF) node. Although FIG. 1 depicts various network service nodes to which the Diameter signaling message may be routed, any other type of network service node(s) configured for servicing a Diameter signaling message may be utilized in system 100 without departing from the scope of the present subject matter.

DSR 104 may interact with various subscriber data management (SDM) nodes, such as SPR 110, HSS 106, and HLR 108. An SDM node may be a designated network node configured to store and/or maintain additional mobile subscriber information, such as identifiers and service and policy profile information associated with the mobile subscriber. An SDM node may be queried by DSR 104 for the additional mobile subscriber information (e.g., identifiers). Other exemplary SDM nodes include PCRF node 114 and a CSCF node.

System 100 may includes a Diameter binding repository (DBR) 102 that comprises a binding query server (BQS) 126 that hosts a binding database 128. In some embodiments, binding database 128 may be configured to store Diameter binding records that provide associations (e.g., Diameter-related bindings, mappings, links, etc.) of mobile subscriber related identifiers and assigned network service nodes. Exemplary Diameter-related bindings stored by DBR 102 may include, but are not limited to, a Diameter session binding, Diameter session-identifier-to-network service node associations, Diameter end-to-end identifier-to-network service node associations, mobile subscriber identifier-to-network service node associations, charging identifier (e.g., IMS charging ID) to-network service node associations, and the like. In the embodiments illustrated herein, DBR 102 is shown as being a stand-alone entity, such as a network node, a server, an application, a computing platform, or a database that is located separate from the Diameter signaling router. However, DBR 102 may be co-located within a DSR or co-located within any other network node in other embodiments (not shown). Although only a single DSR and a single DBR are shown in FIG. 1, the present subject matter may include additional DSRs and DBRs that are communicatively connected to DSR 104 and DBR 102 without departing from the scope of the present subject matter.

Figure 2:
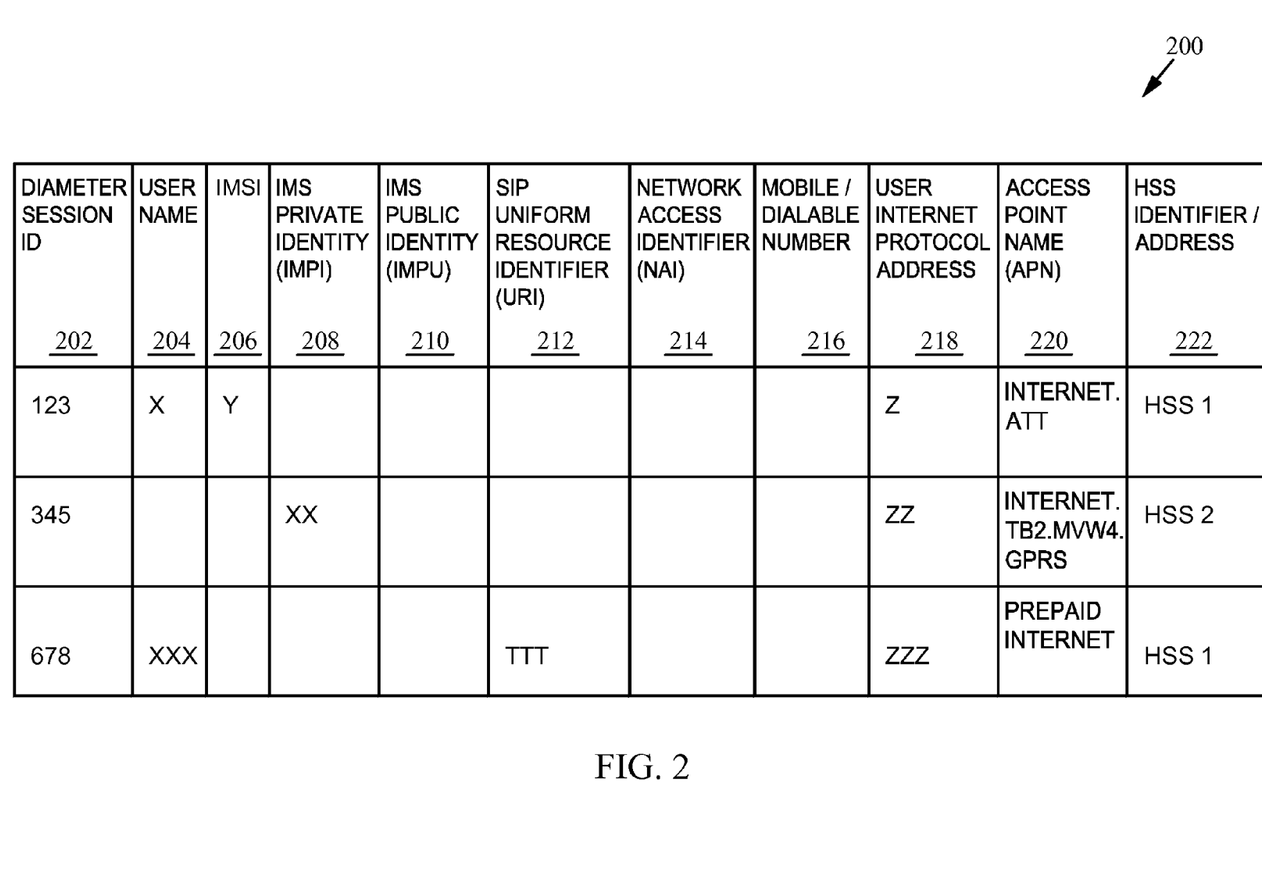
FIG. 2 is an exemplary table depicting Diameter binding record data according to an embodiment of the subject matter described herein.

FIG. 2 illustrates an exemplary table 200 depicting Diameter binding record data according to an embodiment of the subject matter described herein. In some embodiments, table 200 may represent at least a portion of database 128 maintained at DBR 102. Table 200 may include a plurality of mobile subscriber related identifiers 202-218 as column headers. For example, table 200 may include at least one column for each of: a Diameter session identifier 202, a user name 204, an IMPI identifier 208, an IMPU identifier 210, a SIP URI 212, an NAI 214, a mobile or dialable (mobile/dialable) number 216, and a user IP address 218, and access point name (APN) 220. Table 200 may also include a network service node column, such as a CDF identifier/address column 222. Although eleven columns are depicted in FIG. 2, table 200 may include any number of columns associated with any type of identifier.

In some embodiments, Diameter binding record data may be used in determining, identifying, and/or selecting a network service node, e.g., to process a particular Diameter transaction or related Diameter messages. For example, Diameter binding record data may be used to route transactions associated with a particular user as identified by an IMSI value to a particular HSS as identified by an HSS identifier.

In some embodiments, DBR 102 or DSR 104 may be configured to provision table 200. For example, DSR 104 may send a provisioning message to DBR 102. Upon receiving a provisioning message that contains Diameter binding record information (e.g., message 204 in FIG. 2), DBR 102 may add a new Diameter binding record to table 200. In this example, if DBR 102 received a provisioning message that contained Diameter biding record information that included a Diameter session identifier of "678", a SIP URI of "ttt", and a user IP address of "ZZZ" associated with "CDF 1", then DBR 102 may add the new Diameter binding record represented as the last line of table 200.

Figure 3:
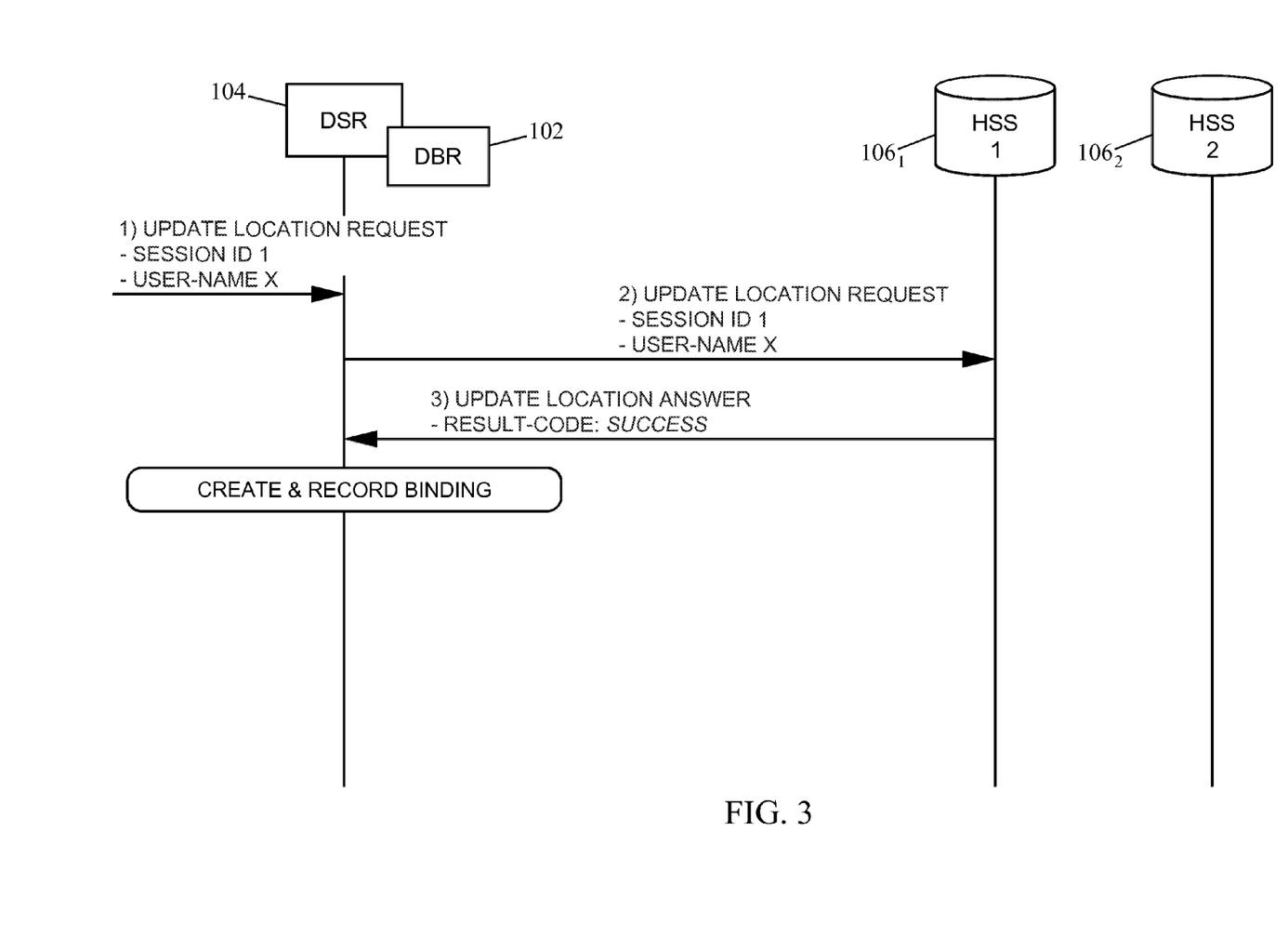
FIG. 3 is a message sequence diagram illustrating learning Diameter binding information according to an embodiment of the subject matter described herein.

FIG. 3 is a message sequence diagram illustrating learning Diameter binding information according to an embodiment of the subject matter described herein. As shown in FIG. 3, in step 1, a Diameter update location request (ULR) message may be sent to DSR 104. The ULR message may include identification information, such as a session ID and a user name (e.g., an IMSI value). For example, the ULR message may be associated with subscriber "X" and may be destined to or require processing by one of a plurality of HSSs $106_{1-2}$ capable of servicing the Diameter ULR message.

DSR 104 may receive the ULR message. After receiving the ULR message, DSR 104 may consult or query DBR 102 to determine if a relevant HSS binding record is available. For example, DSR 104 may use identification information (e.g., a session ID and/or a user identifier) as binding key information when querying DBR 102 or DB 128 for a relevant HSS binding record. If a relevant HSS binding record is available, the HSS binding record may be returned to DSR 104. DSR 104 may use the HSS binding record in routing the ULR message or related messages. For example, the ULR message may be routed to the HSS entity identified in the HSS binding record.

If no HSS binding record is available, DSR 104 may execute a network service node selection algorithm for selecting one of HSSs $106_{1-2}$. For example, DSR 104 may utilize an HSS selection algorithm (e.g., a software module executed by a hardware processor in DSR 104) that when executed designates one HSS (e.g., HSS $106_1$) from the plurality of HSSs $106_{1-2}$ to process the received ULR message. The HSS selection algorithm may use various methods and/or factors for selecting an appropriate HSS. Exemplary selection methods may include one or more of: random selection, round-robin selection, load-based selection, user-based selection, session-based selection, location-based selection, and network-based selection.

In step 2, DSR 104 may route the ULR message to the selected HSS (e.g., HSS $106_1$). In some embodiments, DSR 104 may temporarily store or cache a copy of the ULR message, e.g., prior to routing the ULR message to HSS $106_1$. For example, DSR 104 may maintain a copy of the ULR message until the receipt and processing of a corresponding Update Location Answer (ULA) message from HSS $106_1$.

In step 3, the selected HSS (e.g., HSS $106_1$) may send a response message to DSR 104. For example, HSS $106_1$ may respond with a ULA message. DSR 104 may receive the response message and examine or inspect the contents of the response message to determine whether the HSS was able to successfully process the associated ULR message. In this example, the ULA message may include an indicator, such as a success result code, that indicates successful processing by HSS $106_1$. In some embodiments, a success result code may indicate that sending HSS is the serving HSS for the associated subscriber and/or session.

In some embodiments, upon "learning" or confirming that a selected HSS (e.g., HSS $106_1$) successfully processed a related Diameter request message, DSR 104 may create and/or update binding information in DBR 102. For example, DSR 104 may generate a DBR provisioning message that indicates an association between HSS $106_1$ and identification information (e.g., user name, session identifier, IMS public identifier, IMS private identifier, MSISDN, IMSI, etc.) contained in the ULR and/or ULA messages. DBR 102 or components therein (e.g., BQS 126) may receive this DBR provisioning message and create and store this information in DB 128 as an HSS binding record. The stored HSS binding record or association may be used by DSR 104 (or other DSR 104 in the Diameter network) to quickly route other (e.g., subsequent) Diameter messages associated with the subscriber or session to HSS $106_1$.

After creating and recording an HSS binding record, DSR 104 may route a response message (e.g., the ULA message) towards the ULR request originator.

While FIG. 3 depicts ULR and ULA messages, it will be appreciated that various Diameter messages, such as credit control request (CCR) and credit control answer (CCA) messages, and various network service nodes, such as CDFs 112 or PCRFs 114, may be used without departing from the scope of the present subject matter.

Figure 4:
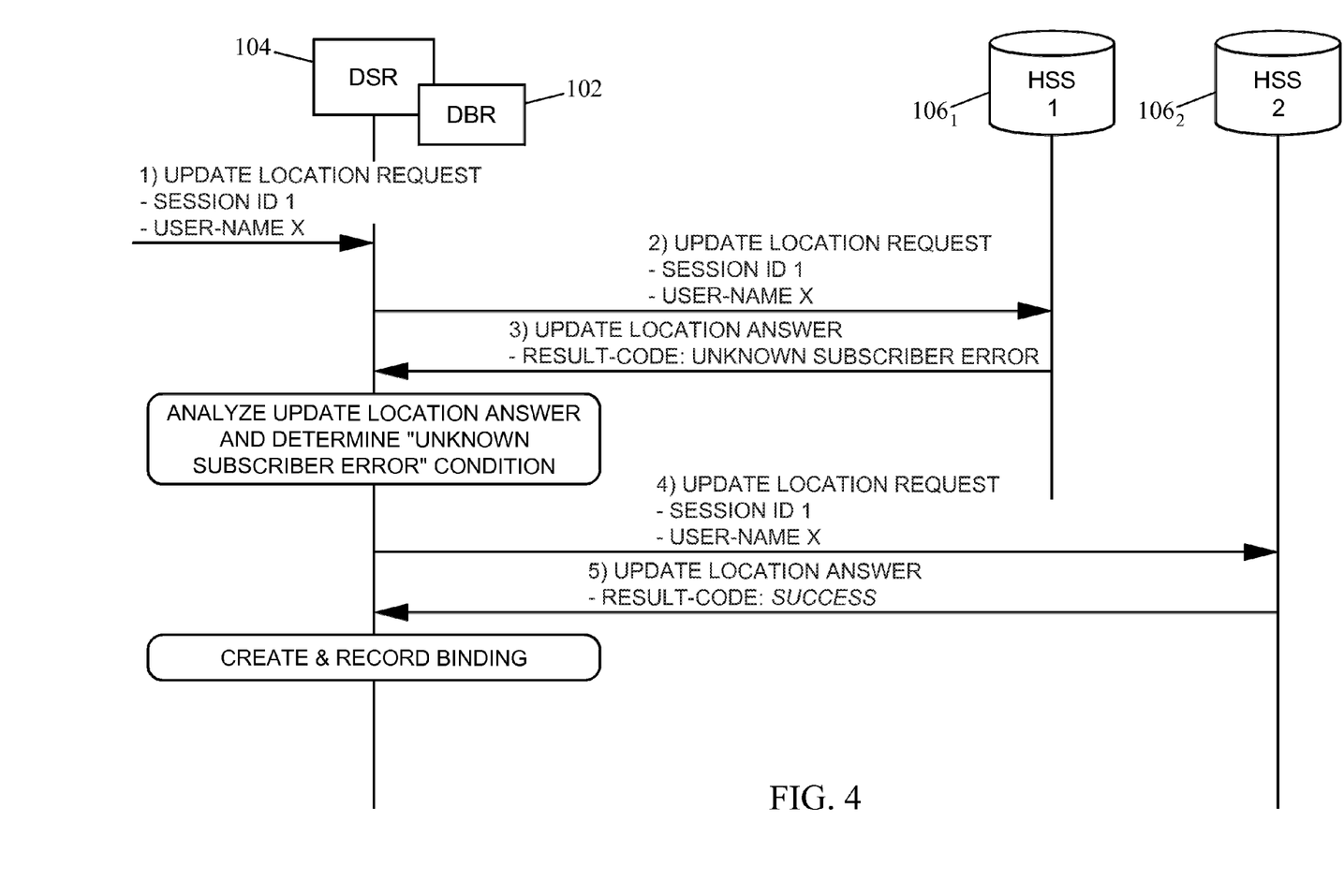
FIG. 4 is a message sequence diagram illustrating learning Diameter binding information associated with an alternate network service node according to an embodiment of the subject matter described herein.

FIG. 4 is a message sequence diagram illustrating learning Diameter binding information associated with an alternate network service node according to an embodiment of the subject matter described herein. In this embodiment, DSR 104 may be configured to select an alternate node (e.g., HSS $106_2$) if a previously selected node (e.g., HSS $106_1$) does not successfully process a Diameter message.

Referring to FIG. 4, steps 1-2 are substantially similar to steps 1-2 of FIG. 3 as described above. For example, in step 1, a Diameter update location request (ULR) message may be sent to DSR 104. The ULR message may include identification information, such as a session ID and a user name (e.g., an IMSI value). DSR 104 may receive the ULR message. After receiving the ULR message, DSR 104 may consult or query DBR 102 and determine that no HSS binding record is available. After determining that no HSS binding record is available, DSR 104 may execute a network service node selection algorithm for selecting one of HSSs $106_{1-2}$. In step 2, DSR 104 may route the ULR message to the selected HSS (e.g., HSS $106_1$). In some embodiments, DSR 104 may temporarily store or cache a copy of the ULR message, e.g., prior to routing the ULR message to HSS $106_1$. For example, DSR 104 may maintain a copy of the ULR message until the receipt and processing of a corresponding ULA message from HSS $106_1$.

In step 3, the selected HSS (e.g., HSS $106_1$) may send a response message to DSR 104. For example, HSS $106_1$ may respond with a ULA message. DSR 104 may receive the response message and examine or inspect the contents of the response message to determine whether the HSS was able to successfully process the associated ULR message. In this example, the ULA message may include an indicator, such as an error result code, that indicates unsuccessful processing by HSS $106_1$. In some embodiments, an error result code may indicate that sending HSS is not the serving HSS for the associated subscriber and/or session.

One exemplary error message may be an unknown subscriber error which indicates that a particular user or subscriber is "unknown" to a particular HSS. In some embodiments, DSR 104 may interpret an unknown subscriber error condition as indicating that sending HSS 106 does not host or maintain data for the associated subscriber (e.g., as identified by a user name or IMSI value).

In response to determining that a Diameter message was unsuccessful processed by HSS $106_1$, DSR 104 may be configured to discard the ULA message received from HSS $106_1$ and to retrieve a copy of the original ULR message from a storage cache.

In step 4, the retrieved ULR message or a similar message may be routed to HSS $106_2$.

In step 5, a response message may be sent from HSS $106_2$ to DSR 104. For example, a ULA message may be sent from HSS $106_2$ to DSR 104. DSR 104 may receive the response message from HSS $106_2$ and examine or inspect the contents of the response message to determine whether HSS $106_2$ was able to successfully process the associated ULR message. For example, the ULA message may include an indicator, such as a success result code, that indicates successful processing by HSS $106_2$.

In some embodiments, upon "learning" or confirming that a selected HSS (e.g., HSS $106_2$) successfully processed a related Diameter request message, DSR 104 may create and/or update binding information in DBR 102. For example, DSR 104 may generate a DBR provisioning message that indicates an association between HSS $106_2$ and identification information contained in the ULR and/or ULA messages. DBR 102 or an associated component may receive this DBR provisioning message and create and store this information as an HSS binding record.

After creating and recording an HSS binding record, DSR 104 may route a response message (e.g., the ULA message from HSS $106_2$) towards the ULR request originator.

While FIG. 4 depicts ULR and ULA messages, it will be appreciated that various Diameter messages and nodes may be used without departing from the scope of the present subject matter.

Figure 5:
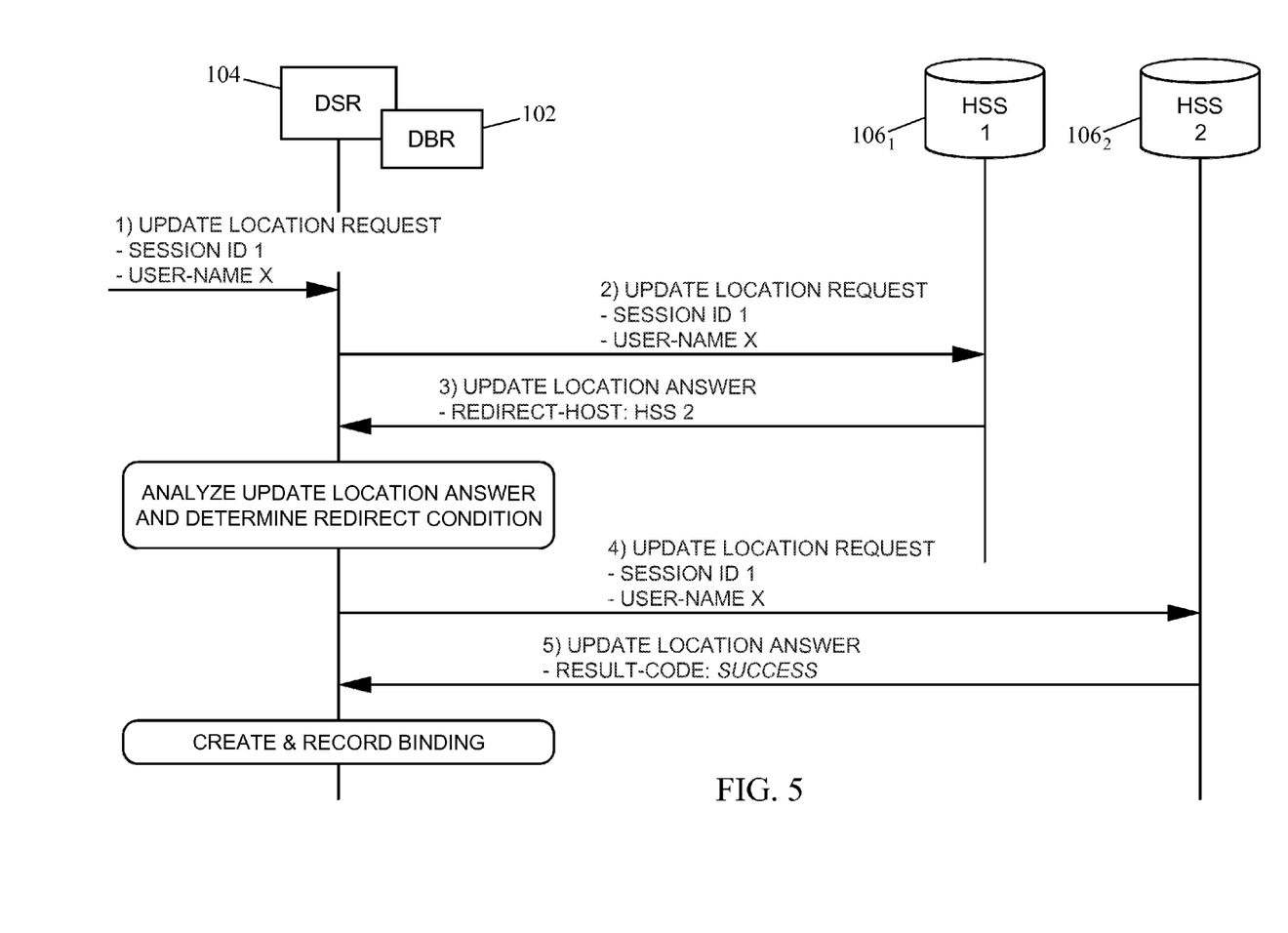
FIG. 5 is a message sequence diagram illustrating learning Diameter binding information in response to a redirection indicator according to an embodiment of the subject matter described herein.

FIG. 5 is a message sequence diagram illustrating learning Diameter binding information in response to a redirection indicator in a response message according to an embodiment of the subject matter described herein. In this embodiment, DSR 104 may be configured to analyze Diameter response message for redirection indicators. In some embodiments, DSR 104 may create and record binding information based on received redirection indicators or related information. In some other embodiments, DSR 104 may record or update binding information after a redirection indicator has been confirmed. For example, DSR 104 may update DBR 102 after sending a Diameter request message to a destination indicated by a redirection indicator and receiving a Diameter response message containing an indicator that indicates the Diameter request message was successfully processed by the destination.

Referring to FIG. 5, steps 1-2 are substantially similar to steps 1-2 of FIG. 3 as described above. For example, in step 1, a Diameter update location request (ULR) message may be sent to DSR 104. The ULR message may include identification information, such as a session ID and a user name (e.g., an IMSI value). DSR 104 may receive the ULR message. After receiving the ULR message, DSR 104 may consult or query DBR 102 and determine that no HSS binding record is available. As such, DSR 104 may execute a network service node selection algorithm for selecting one of HSSs $106_{1\text{-}2}$. In step 2, DSR 104 may route the ULR message to the selected HSS (e.g., HSS 1064 In some embodiments, DSR 104 may temporarily store or cache a copy of the ULR message, e.g., prior to routing the ULR message to HSS $106_1$. For example, DSR 104 may maintain a copy of the ULR message until the receipt and processing of a corresponding ULA message from HSS $106_1$.

In step 3, the selected HSS (e.g., HSS $106_1$) may send a response message to DSR 104. For example, HSS $106_1$ may respond with a ULA message. DSR 104 may receive the response message and examine or inspect the contents of the response message to determine whether HSS $106_1$ was able to successfully process the associated ULR message. In this example, the ULA message may include an indicator, such as an error result code, that indicates unsuccessful processing by HSS $106_1$.

In some embodiments, a received Diameter message may be analyzed or inspected for redirection indicators. One exemplary redirection indicator may be a Redirect-Host AVP. For example, a Redirect-Host AVP may be present if an error bit or 'E' bit is set in a response message. In this example, the Result-Code AVP may include a Diameter redirection indication or related information, such as a node identifier. In some embodiments, upon receiving a Diameter message including a Result-Code AVP, the receiving Diameter node may forward the request directly to one of the nodes identified in the AVP.

In some embodiments, in response to receiving a Diameter response message including a redirection indicator, DSR 104 may create and/or update binding information in DBR 102. For example, DSR 104 may generate and send a DBR provisioning message that indicates an association between HSS $106_2$ and identification information contained in the ULR and/or ULA messages. DBR 102 or an associated component may receive this DBR provisioning message and create and store this information as an HSS binding record.

In some other embodiments, DSR 104 may not perform a binding update until HSS $106_2$ has confirmed that it has successfully processed a related Diameter message. For example, in response to determining that a receiving a response message including an indicator indicating unsuccessful processing by HSS $106_1$, DSR 104 may be configured to discard the ULA message received from HSS $106_1$ and to retrieve a copy of the original ULR message from a storage cache.

In step 4, the retrieved ULR message or a similar message may be routed to HSS $106_2$.

In step 5, a response message may be sent from HSS $106_2$ to DSR 104. For example, a ULA message may be sent from HSS $106_2$ to DSR 104. DSR 104 may receive the response message from HSS $106_2$ and examine or inspect the contents of the response message to determine whether HSS $106_2$ was able to successfully process the associated ULR message. For example, the ULA message may include an indicator, such as a success result code, that indicates successful processing by HSS $106_2$.

In some embodiments, upon "learning" or confirming that an HSS (e.g., HSS $106_2$) successfully processed a related Diameter request message, DSR 104 may create and/or update binding information in DBR 102. For example, DSR 104 may generate a DBR provisioning message that indicates an association between HSS $106_2$ and identification information contained in the ULR and/or ULA messages. DBR 102 may receive this DBR provisioning message and create and store this information as an HSS binding record.

After creating and recording an HSS binding record, DSR 104 may route a response message (e.g., the ULA message from HSS $106_2$) towards the ULR request originator.

While FIG. 5 depicts ULR and ULA messages, it will be appreciated that various Diameter messages and nodes may be used without departing from the scope of the present subject matter.

Figure 6:
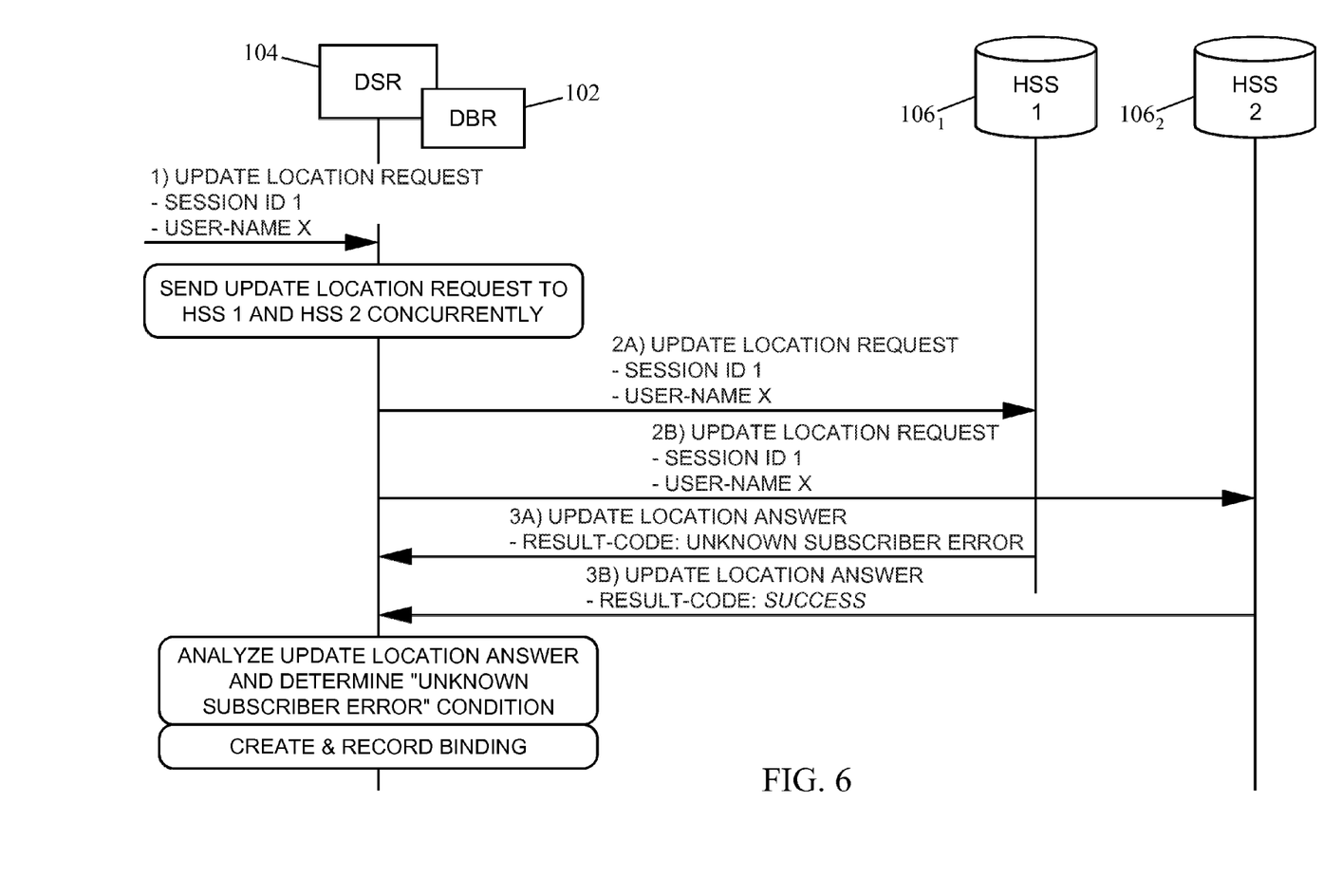
FIG. 6 is a message sequence diagram learning Diameter binding information in response to multiple response messages according to an embodiment of the subject matter described herein.

FIG. 6 is a message sequence diagram learning recording Diameter binding information in response to multiple response messages according to an embodiment of the subject matter described herein. In this embodiment, DSR 104 may be configured to send a Diameter request message or similar messages to multiple HSSs $106_{1-2}$. For example, substantially similar Diameter messages (e.g., ULR messages associated with the same session and/or subscriber) may be sent to HSSs $106_{1-2}$ in an attempt to determine an appropriate HSS 106.

Referring to FIG. 6, in step 1, a ULR message may be sent to DSR 104. The ULR message may include identification information, such as a session ID and a user name (e.g., an IMSI value). DSR 104 may receive the ULR message and may query DBR 102 for a relevant HSS binding record. If no HSS binding record is located in DBR 102, DSR 104 may determine all possible HSSs which may be capable of successfully processing the ULR message. For example, DSR 104 may determine HSS $106_1$ or HSS $106_2$ could possibly be provisioned with the associated subscriber's data. DSR 104 may then generate one or more copies of the received ULR message. In some embodiments, DSR 104 may temporarily store or cache a copy of the ULR message, e.g., prior to routing the ULR message to HSS $106_1$ and HSS $106_2$.

In steps 2A-B, DSR 104 may simultaneously or concurrently route one ULA message to HSS $106_1$ and another ULA message to HSS $106_2$. For example, each ULR message may be associated with subscriber "X" and include a session ID value of "1". In some embodiments, DSR 104 may temporarily store or cache a copy of one or both of the ULR messages, e.g., prior to routing the ULR messages. DSR 104 may store the message(s) until one or more response messages are received.

In step 3A, a response message may be sent from HSS $106_1$ to DSR 104. For example, a ULA message may be sent from HSS $106_1$ to DSR 104. DSR 104 may receive the response message from HSS $106_1$ and analyze or inspect the contents of the response message to determine whether the HSS was able to successfully process the associated ULR message. For example, the ULA message may include an indicator, such as an error result code, that indicates an unknown subscriber error. In some embodiments, after receiving a response message that indicates an HSS is not suitable for handling messages associated with a particular session or user, the response message may be logged and/or discarded.

In step 3B, a response message may be sent from HSS $106_2$ to DSR 104. For example, a ULA message may be sent from HSS $106_2$ to DSR 104. DSR 104 may receive the response message from HSS $106_2$ and examine or inspect the contents of the response message to determine whether the HSS was able to successfully process the associated ULR message. For example, the ULA message may include an indicator, such as a success result code, that indicates successful processing by HSS $106_2$.

In some embodiments, upon "learning" or confirming that an HSS (e.g., HSS $106_2$) successfully processed a related Diameter request message, DSR 104 may create and/or update binding information in DBR 102.

In some embodiments, an HSS binding record may be generated and stored in DBR 102 when a first response message is received by DSR 104 from an HSS 106 indicating that a Diameter message was successfully processed.

In some embodiments, if multiple HSSs (e.g., HSS $106_{1-2}$) are capable of successfully processing a Diameter message associated with the given subscriber and/or session, an HSS binding record may be generated and stored in DBR 102 indicating that the multiple HSSs are capable of processing Diameter messages associated with the given subscriber and/or session.

After creating and recording an HSS binding record, DSR 104 may route a response message (e.g., the ULA message from HSS $106_2$) towards the ULR request originator.

While FIG. 6 depicts ULR and ULA messages, it will be appreciated that various Diameter messages and nodes may be used without departing from the scope of the present subject matter.

Figure 7:
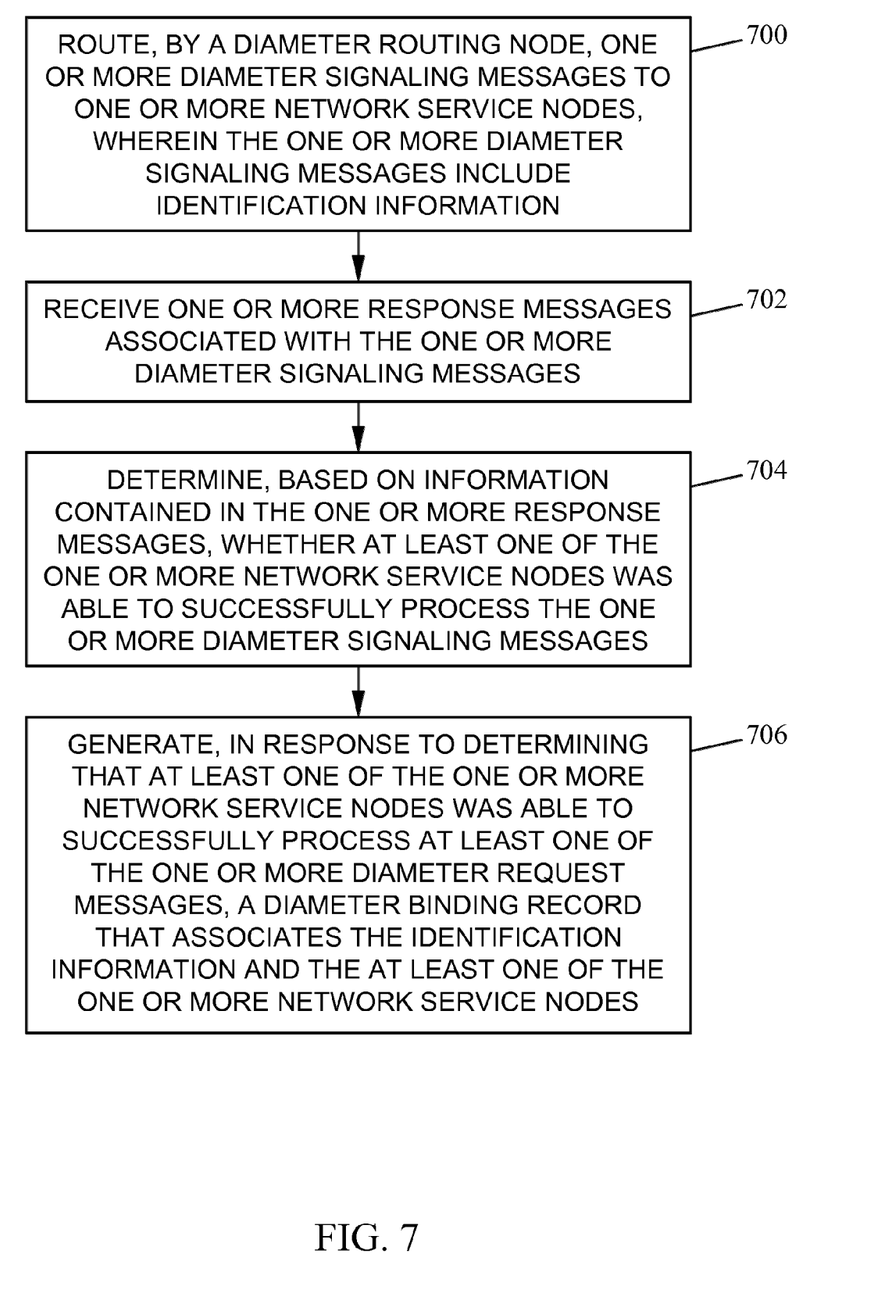
FIG. 7 is a flow chart illustrating an exemplary process for dynamically learning Diameter binding information according to an embodiment of the subject matter described herein.

FIG. 7 is a flow chart illustrating an exemplary process for dynamically learning Diameter binding information according to an embodiment of the subject matter described herein. In some embodiments, the exemplary process described herein, or portions thereof, may be performed by DSR 104, DRE 122, DBR 102, and/or other module(s) or node(s).

In block 700, one or more Diameter signaling messages may be routed, by a Diameter routing node, to one or more network service nodes. The one or more Diameter signaling messages may include identification information, such as an IMSI value, APN value, IP address, and/or a session identifier. For example, DSR 104 may receive a Diameter based request message, such as a ULR message, from a sending Diameter based node (e.g., a MME) and route that message to a selected HSS 106 of a plurality of HSSs $106_{1-2}$.

One of a plurality of network service nodes may be selected based on various factors. For example, a received Diameter signaling message may be addressed to or directed toward an original network service node destination, such as HSS $106_1$. In this example, DSR 104 may select the addressed network service node as the appropriate node to process the received Diameter signaling message. In another example, DSR 104 may be configured to utilize a network service node selection module (e.g., a software algorithm that is executed by a hardware processor) to select one network service node from a plurality of network service nodes that are capable of processing or servicing the Diameter signaling message. For example, one of HSS $106_{1-2}$ may be selected to process a ULR message received by DSR 104 based on a load-based selection method.

In some embodiments, identification information may be used in selecting one of a plurality of network service nodes. Examples of identification information include parameters and identifier information such as Diameter session-identifier information, user name information, a user Internet protocol (IP) information, IP multimedia subsystem (IMS) private identity (IMPI) information, IMS public identity (IMPU) information, session initiation protocol (SIP) uniform resource identifier (URI) information, a URI, an Internet protocol (IP) address, an access point name (APN), mobile station international subscriber directory number (MSISDN) information, mobile/dialable number information, a session identifier, an international mobile subscriber identity (IMSI), IMS charging identifier information, a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user name attribute value pair (AVP), a network access identifier (NAI), serving location area code information, serving cell identification information, mobile subscriber geo-location coordinate information, and tracking area information.

After being routed to a network service node, the Diameter signaling message may be processed by the network service node. For example, after receiving and processing a ULR message, HSS $106_1$ may generate a ULA message containing one or more status conditions, e.g., a success result code. HSS $106_1$ may send the ULA message to DSR 104.

In block 702, one or more response messages associated with the one or more Diameter signaling messages may be received.

In block 704, it is determined, based on information contained in the one or more response messages, whether at least one of the one or more network service nodes was able to successfully process the one or more Diameter signaling messages. For example, a ULA message containing a status condition or result code may be analyzed by DSR 104. The result code may indicate that the Diameter signaling message was successfully processed at HSS 106.

In some embodiments, determining, based on information contained in the one or more response messages, whether at least one of the one or more network service nodes was able to successfully process the one or more Diameter signaling messages may include determining, based on a Diameter Result-Code attribute value pair (AVP) value, a Diameter Redirect-Host AVP value, or a Diameter message "Error" bit. For example, a Diameter response message may include various AVP values or other indicators that DSR 104 may interpret for determining whether a corresponding Diameter based request message was successfully processed.

In block 706, in response to determining that at least one of the one or more network service nodes was able to successfully process at least one of the one or more Diameter request messages, a Diameter binding record may be generated. The Diameter binding record may associate the identification information and the at least one of the one or more network service nodes. For example, a Diameter session ID and/or a user identifier (e.g., an IMSI value or IP address) may be associated with an HSS or other network service node identifier. After generating and storing the Diameter binding record, DSR 104 may use the Diameter binding record to quickly route other Diameter messages associated with the transaction, session, or user to the same network service node.

In some embodiments, the Diameter binding record may be stored in a DBR 102 or related binding database 128. For example, the binding record may be stored in a local DBR 102 and may be sent to other DBRs 102 associated with other DSRs 104 in the network. In another example, the binding record may be stored in a central DBR 102 that may be accessible by multiple DSRs 104 located in the network. In some embodiments, a binding record may be discarded after an amount of time has elapsed (e.g., as determined by a time to live (TTL) value associated with a binding record) or after a period of inactivity (e.g., after no Diameter messages for session "X" has been received in 24 hours). For example, to prevent DBR 102 or related binding database 128 from running out of memory, DSR 104, DBR 102, or another entity may discard old, stale, or inactive binding records from DBR 102 or related binding database 128.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for dynamically learning Diameter binding information, the method comprising:
    receiving one or more Diameter signaling messages, wherein the one or more Diameter signaling messages include identification information;
    determining whether a Diameter binding record is associated with the identification information;
    in response to determining that no Diameter binding record is associated with the identification information, routing, by a Diameter routing node, the one or more Diameter signaling messages to one or more network service nodes;
    receiving one or more response messages associated with the one or more Diameter signaling messages;
    determining, based on information contained in the one or more response messages, whether at least one of the one or more network service nodes was able to successfully process the one or more Diameter signaling messages;
    generating, in response to determining that at least one of the one or more network service nodes was able to successfully process at least one of the one or more Diameter signaling messages, a Diameter binding record that associates the identification information and the at least one of the one or more network service nodes; and
    storing the Diameter binding record in a Diameter binding repository (DBR).

2. The method of claim 1 wherein the one or more network service nodes includes a first network service node and wherein the one or more Diameter signaling messages includes a Diameter request message, and wherein the method further comprises:
    routing, in response to determining that the first network service node was not able to successfully process the Diameter request message, the Diameter request message to a second network service node;
    receiving, from the second network service node, a Diameter answer message associated with the Diameter request message;
    determining, based on information contained in the second Diameter answer message, whether the second network service node was able to successfully process the Diameter request message; and
    generating, in response to determining that the second network service node was able to successfully process the Diameter request message, a Diameter binding record that associates the identification information and the second network service node.

3. The method of claim 1 wherein the one or more network service nodes includes a first network service node and wherein the one or more Diameter signaling messages includes a Diameter request message, and wherein the method further comprises:

generating, in response to determining that the first network service node was not able to successfully process the Diameter request message, a Diameter binding record that associates the identification information and a second network service node identified in a redirection indicator contained in a Diameter answer message associated with the Diameter request message; and routing the Diameter request message to the second network service node.

4. The method of claim 1 wherein the one or more network service nodes includes a first network service node and a second network service node and wherein the one or more Diameter signaling messages includes a first Diameter request message and a second Diameter request message, wherein the first Diameter request message is routed to the first network service node, wherein the second Diameter request message is generated based on the first Diameter request message and is routed to the second network service node prior to a first Diameter answer message associated with the first Diameter request message being received at the Diameter routing node.

5. The method of claim 1 wherein determining, based on information contained in the one or more response messages, whether at least one of the one or more network service nodes was able to successfully process the one or more Diameter signaling messages includes determining, based on a Diameter Result-Code attribute value pair (AVP) value, a Diameter Redirect-Host AVP value, or a Diameter message error bit.

6. The method of claim 1 including caching a copy of the one or more Diameter signaling messages prior to routing the one or more Diameter signaling messages to the one or more network service nodes.

7. The method of claim 1 wherein the Diameter binding record is discarded after an amount of time has elapsed or after a period of inactivity.

8. The method of claim 1 wherein the DBR is co-located with the Diameter router.

9. The method of claim 1 wherein the DBR is located on a node or platform that is separate from the Diameter router.

10. The method of claim 1 wherein the Diameter routing node includes at least one of: a Diameter signaling router (DSR), a Diameter routing agent (DRA), a Diameter proxy agent (DPA), a Diameter redirect agent, a Diameter translation agent, and a Diameter relay agent.

11. The method of claim 1 wherein the identification information includes at least one of: Diameter session-identifier information, user name information, a user Internet protocol (IP) information, IP multimedia subsystem (IMS) private identity (IMPI) information, IMS public identity (IMPU) information, session initiation protocol (SIP) uniform resource identifier (URI) information, a URI, an Internet protocol (IP) address, an access point name (APN), mobile station international subscriber directory number (MSISDN) information, mobile/dialable number information, a session identifier, an international mobile subscriber identity (IMSI), IMS charging identifier information, a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user name attribute value pair (AVP), a network access identifier (NAI), serving location area code information, serving cell identification information, mobile subscriber geo-location coordinate information, and tracking area information.

12. The method of claim 1 wherein the one or more network service nodes includes at least one of: a network charging node, an online charging system (OCS) node, an offline charging system (OFCS) node, a charging trigger function (CTF) node, a charging gateway function (CGF) node, a charging data function (CDF) node, a policy and charging rules function (PCRF) node, a home subscriber server (HSS) node, an authentication, authorization, and accounting (AAA) node, and a home location register node (HLR).

13. A system for dynamically learning Diameter binding information, the system comprising:

a Diameter binding repository (DBR) configured to store Diameter binding records; and a Diameter routing node configured to receive one or more Diameter signaling messages, wherein the one or more Diameter signaling messages include identification information, to determine whether a Diameter binding record is associated with the identification information, in response to determining that no Diameter binding record is associated with the identification information, to route the one or more Diameter signaling messages to one or more network service nodes, to receive one or more response messages associated with the one or more Diameter signaling messages, to determine, based on information contained in the one or more response messages, whether at least one of the one or more network service nodes was able to successfully process the one or more Diameter signaling messages, and to generate, in response to determining that at least one of the one or more network service nodes was able to successfully process at least one of the one or more Diameter signaling messages, a Diameter binding record that associates the identification information and the at least one of the one or more network service nodes.

14. The system of claim 13 wherein the one or more network service nodes includes a first network service node and wherein the one or more Diameter signaling messages includes a Diameter request message, wherein the Diameter routing node is configured to route, in in response to determining that the first network service node was not able to successfully process the Diameter request message, the Diameter request message to a second network service node, to receive, from the second network service node, a Diameter answer message associated with the Diameter request message, to determine, based on information contained in the second Diameter answer message, whether the second network service node was able to successfully process the Diameter request message, and to generate, in response to determining that the second network service node was able to successfully process the Diameter request message, a Diameter binding record that associates the identification information and the second network service node.

15. The system of claim 13 wherein the one or more network service nodes includes a first network service node and wherein the one or more Diameter signaling messages includes a Diameter request message, wherein the Diameter routing node is configured to generate, in response to determining that the first network service node was not able to successfully process the Diameter request message, a Diameter binding record that associates the identification information and a second network service node identified in a redirection indicator contained in a Diameter answer message associated with the Diameter request message and to route the Diameter request message to the second network service node.

16. The system of claim 13 wherein the one or more network service nodes includes a first network service node and a second network service node and wherein the one or more Diameter signaling messages includes a first Diameter request message and a second Diameter request message, wherein the Diameter routing node is configured to generate the second Diameter request message based on the first Diameter request message, to route the first Diameter request message to the first network service node, and to route the second Diameter request message to the network service node, wherein the first Diameter request message and the second Diameter request message are routed prior to receiving, at the Diameter routing node, a first Diameter answer message associated with the first Diameter request message.

17. The system of claim 13 wherein determining, based on information contained in the one or more response messages, whether at least one of the one or more network service nodes was able to successfully process the one or more Diameter signaling messages includes determining, based on a Diameter Result-Code attribute value pair (AVP) value, or a Diameter Redirect-Host AVP value, or a Diameter message error bit.

18. The system of claim 13 wherein the Diameter binding record is stored in the DBR.

19. The system of claim 17 wherein the Diameter binding record is discarded after an amount of time has elapsed or after a period of inactivity.

20. The system of claim 17 wherein the DBR is co-located with the Diameter router.

21. The system of claim 17 wherein the DBR is located on a node or platform that is separate from the Diameter router.

22. The system of claim 13 wherein the Diameter routing node includes at least one of: a Diameter signaling router (DSR), a Diameter routing agent (DRA), a Diameter proxy agent (DPA), a Diameter redirect agent, a Diameter translation agent, and a Diameter relay agent.

23. The system of claim 13 wherein the identification information includes at least one of: Diameter session-identifier information, user name information, a user Internet protocol (IP) information, IP multimedia subsystem (IMS) private identity (IMPI) information, IMS public identity (IMPU) information, session initiation protocol (SIP) uniform resource identifier (URI) information, a URI, an Internet protocol (IP) address, an access point name (APN), mobile station international subscriber directory number (MSISDN) information, mobile/dialable number information, a session identifier, an international mobile subscriber identity (IMSI), IMS charging identifier information, a mobile subscriber directory number (DN), a globally unique temporary identifier (GUTI), a serving MSC address information, visitor location register (VLR) number information, serving General Packet Radio Service (GPRS) support node (SGSN) address information, SGSN number information, visited mobile country code (MCC) information, mobile network code (MNC) information, a user name attribute value pair (AVP), a network access identifier (NAI), serving location area code information, serving cell identification information, mobile subscriber geo-location coordinate information, and tracking area information.

24. The method of claim 13 wherein the one or more network service nodes includes at least one of: a network charging node, an online charging system (OCS) node, an offline charging system (OFCS) node, a charging trigger function (CTF) node, a charging gateway function (CGF) node, a charging data function (CDF) node, a policy and charging rules function (PCRF) node, a home subscriber server (HSS) node, an authentication, authorization, and accounting (AAA) node, and a home location register node (HLR).

25. A non-transitory computer readable medium comprising computer executable instructions embodied in a computer readable medium that when executed by a processor of a computer control the computer to perform steps comprising:
    receiving one or more Diameter signaling messages, wherein the one or more Diameter signaling messages include identification information;
    determining whether a Diameter binding record is associated with the identification information;
    in response to determining that no Diameter binding record is associated with the identification information, routing, by a Diameter routing node, the one or more Diameter signaling messages to one or more network service nodes;
    receiving one or more response messages associated with the one or more Diameter signaling messages;
    determining, based on information contained in the one or more response messages, whether at least one of the one or more network service nodes was able to successfully process the one or more Diameter signaling messages; and
    generating, in response to determining that at least one of the one or more network service nodes was able to successfully process at least one of the one or more Diameter signaling messages, a Diameter binding record that associates the identification information and the at least one of the one or more network service nodes.

\* \* \* \* \*